July 14, 1959 D. K. BEAVON 2,894,825
APPARATUS FOR DISPERSING SOLIDS IN GASES IN THE
CATALYTIC TREATMENT OF HYDROCARBON OILS
Filed Dec. 30, 1954 2 Sheets-Sheet 1

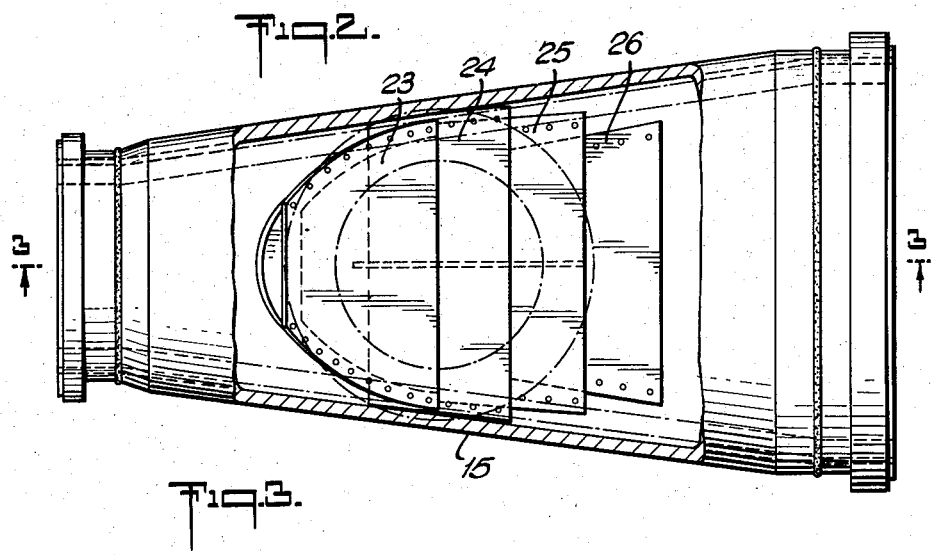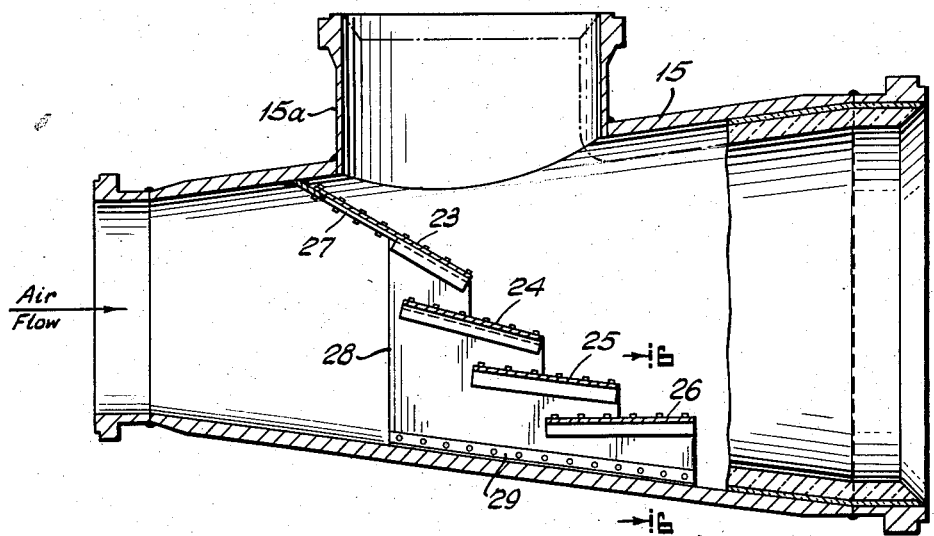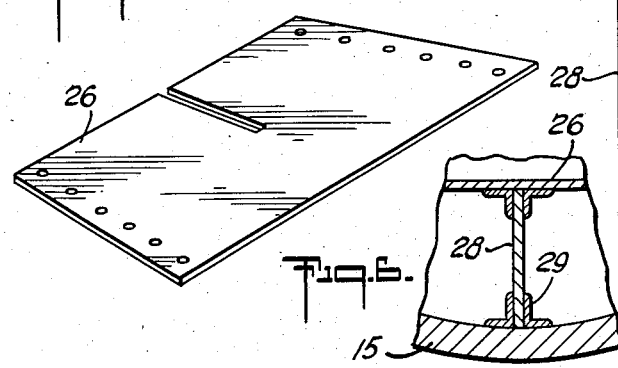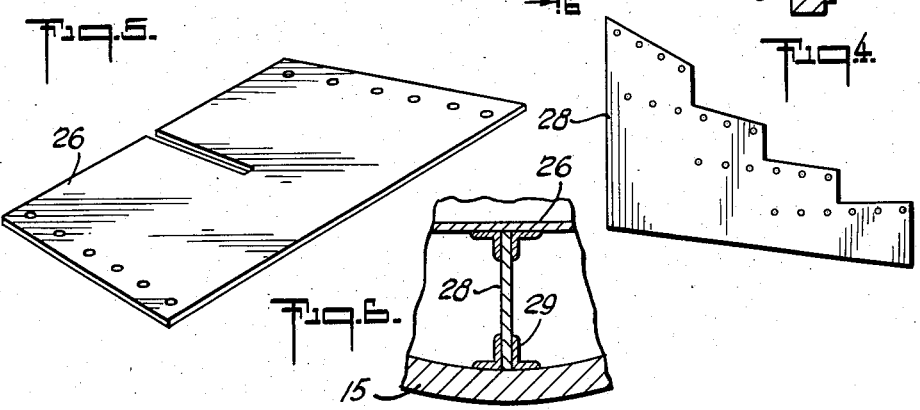

United States Patent Office 2,894,825
Patented July 14, 1959

2,894,825

APPARATUS FOR DISPERSING SOLIDS IN GASES IN THE CATALYTIC TREATMENT OF HYDROCARBON OILS

David K. Beavon, Los Angeles, Calif., assignor to Texaco Inc., a corporation of Delaware Application December 30, 1954, Serial No. 478,563

2 Claims. (Cl. 23—288)

This invention is concerned with distributing or dispersing pulverulent or powdered solids in a gaseous medium. The invention is particularly directed to the handling of solid particulate catalyst in the catalytic treatment of hydrocarbon oils.

The invention involves certain improvements in apparatus and process for dispersing and transporting finely divided solids as a suspension in a gaseous medium wherein the finely divided solids are delivered as a compact mass of descending solids to a dispersion zone into which a gaseous medium is directed transversely of the descending solids to effect entrainment of the solids in the gaseous stream. A feature of the invention involves the introduction of the gaseous medium into contact with the descending solids through a plurality of vertically separated and restricted passages to thereby effect the initial contacting at points of maximum gas pressure. The invention is of particular application in the catalytic treating of hydrocarbon oils and is described herein in detail in reference to such process.

It is well known to subject hydrocarbon oil to cracking in contact with solid catalyst by contacting the oil and catalyst under fluidized conditions, withdrawing the catalyst from the cracking reactor, dispersing it in a stream of air by which it is conveyed to a regenerator to effect the reactivation of the catalyst and returning the catalyst to the reactor. In this type of process erosion has presented a problem which has been particularly acute in the transfer of the catalyst from the reactor to the regenerator. The catalyst from the reactor descends through the usual standpipe to a T or horizontal connection into which the air is introduced for picking up the catalyst for conveyance to the regenerator. These cracking operations are usually conducted in large units in which many tons of catalyst are transported daily and the erosion particularly in the T connection or transverse line has been of a serious nature. In previous systems the catalyst has been allowed to fall through the air stream without much of it being entrained before it reaches the bottom of the conduit. Thus a pile of catalyst forms partially blocking the line and much of the catalyst becomes entrained only when it is scoured off the top of this pile. The present invention provides for entraining all, or at least most, of the catalyst before it reaches the bottom of the transfer line and furnishes means for greatly reducing erosion in the transfer line.

In accordance with the invention the catalyst descending from the reactor standpipe is caused to cascade over a plurality of inclined over-lapping baffle plates disposed in the horizontal connection or T and air flowing between the baffle plates picks up the catalyst and disperses it for conveyance through the transfer line to the regenerator.

A feature of the invention is that the baffle plates are inclined downwardly in the direction of flow through the transfer line at successively decreased angles to the horizontal from the top downwardly. By having the baffles inclined the fall of the catalyst into the incoming streams of air between the baffles is facilitated and the baffles constitute obstacles tending to prevent up stream surges. The arrangement also reduces the pressure drop in the transfer line which is beneficial to the air blower capacity and facilitates higher pressures in the regenerating zone which favor higher burning rates.

An important advantage of the invention is that by having the over-lapping baffles disposed at decreased angles to the horizontal from top to bottom, the entraining gas is at the maximum velocity exactly at the point where it first comes in contact with the catalyst.

The invenion is described herein in reference to a catalytic cracking system in which catalyst from the cracking reactor is withdrawn through a standpipe and transported in a stream of air or oxygen containing gas to a regenerator wherein carbonaceous deposits are burned to effect reactivation of the catalyst and the reactivated catalyst returned to the cracking reactor.

Figure 2 is an enlarged plan view of the dispersing chamber or connection between the reactor standpipe and the transfer line in which the catalyst is conducted to the regenerator.

Figure 3 is a section taken along the line 3—3 of Fig. 2 and shows the baffle arrangements within the connection or T chamber.

Figure 4 is a side view of a vertical support plate for the baffles.

Figure 5 is a view in perspective of one of the baffles.

Figure 6 is an enlarged section taken on the line 6—6 of Fig. 3.

Figure 1:
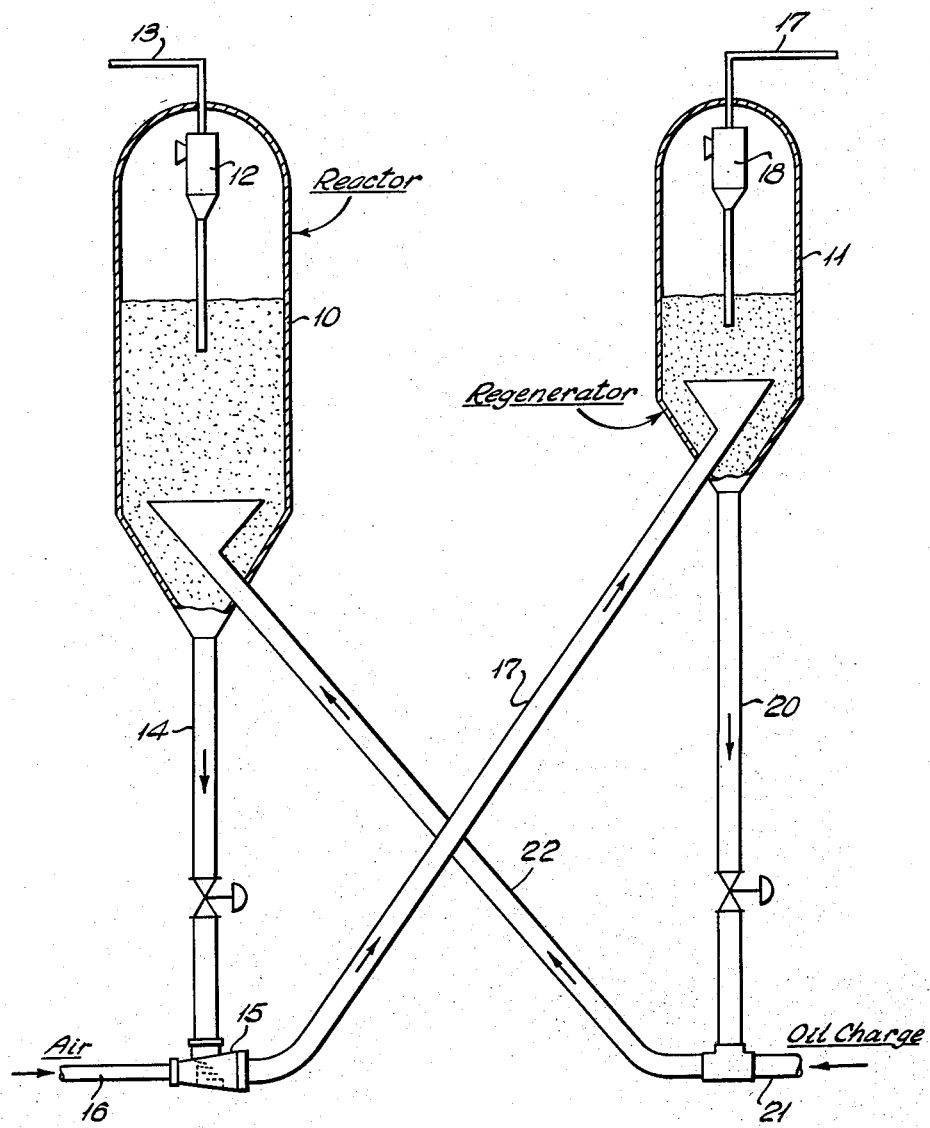
Figure 1 is a flow diagram of such a catalytic cracking system employing the present invention.

Referring now to Figure 1, 10 designates the catalytic cracking reactor and 11 the regenerator. In the reactor hydrocarbon oil is subjected to conversion in contact with cracking catalyst under fluidized conditions. The reaction vapors and gases are withdrawn through a cyclonic separator 12 and vapor line 13 to suitable fractionating and condensing equipment (not shown) for recovering the prodoucts. Catalyst descends through a standpipe 14 to a dispersing chamber 15 into which air is introduced by line 16. The catalyst received in chamber 15 is dispersed in the air and is conducted through a transfer line 17 to the regenerator 11 wherein carbonaceous material is burned and the catalyst regenerated. The resultant flue gases are withdrawn through a cyclonic separator 18 and flue gas line 19. The regenerated catalyst descends through a standpipe 20 and is picked up by oil charging stock introduced by a line 21 and the oil and catalyst are delivered through a transfer line 22 to the reactor.

Figures 2 and 3 constitute enlarged views of the dispersing chamber 15. This chamber is essentially a T connection with the vertical section 15a connected to the standpipe 14 to receive the catalyst from the reactor and the horizontal section disposed at one end to receive the air from line 16 and the other end connected to the transfer line 17 for delivering the dispersion of air and catalyst to the regenerator. As shown in the drawing the chamber 15 is formed with increasing diameters in the direction of the down stream end.

Baffles 23, 24, 25 and 26 are disposed in cascade and overlapped relation across the opening from the standpipe 14. Each baffle extends laterally entirely across the pipe member 15 and is supported at each end by being bolted to a support plate 27 which is welded to the shell of member 15. For additional support a vertical plate 28, secured to the bottom of the chamber 15 by angle irons 29, is provided. The top of the support plate 28 is stepped to accommodate these several baffles which are disposed at the several levels and are secured to the plate by angle irons. Each of baffles 24, 25 and 26 is slotted to accommodate the overlapped portions. Figure 5 shows baffle 26 slotted to accommodate that portion of the baffle extending underneath the superposed baffle 25. The upper baffle 27 is welded to the shell of the chamber 15.

As shown in the drawing the several baffles are generally inclined downwardly in the direction of flow through the chamber or transfer line and at progressively decreased angles to the horizontal from the top downwardly. As specifically shown in the drawing each of baffles 24 and 25 is disposed at a less angle to the horizontal than the superposed baffle and the bottom baffle 26 is at zero angle to the horizontal. The bottom baffle may also be in an inclined position but in some cases there appears to be an advantage in having the bottom baffle horizontal as a precaution against any erosion in the bottom of the transfer line downstream from the baffles. The air velocity below the bottom baffle will be lower than the velocity between the other baffles and so an alternative arrangement is to have the bottom baffle parallel to the superposed baffle to collect air and increase somewhat the velocity at the bottom.

By having the over-lapping baffles disposed at decreased angles to the horizontal, the effect is that the most restricted passages for the air are at the exact points where the air first comes in contact with the catalyst particles. These points represent the zones of maximum velocity of the air which facilitates the dispersion of the catalyst particles in the air. It frequently happens that the catalyst may come down from the standpipe in slugs and thus by means of the invention the highest velocity air is directed to the breaking up of the slugs and dispersing the catalyst particles. While the inclined baffles facilitate the fall of the catalyst into the several air streams they also present obstacles tending to prevent upstream surges in the line.

By way of example a fluid catalytic cracking operation was conducted with the chamber 15 having baffle 23 disposed at an angle of 30° to the horizontal, baffle 24 at an angle of 15°, baffle 25 at an angle of 7½° and baffle 26 at zero angle. The baffle plates were covered with an acid proof cement. The oil feed rate was 27,270 barrels per day of fresh feed, the temperature in the reactor averaged about 964° F. under 15 p.s.i.g. and the pressure in the regenerator averaged about 4.5 p.s.i.g. Approximately 36,720 tons of catalyst were transferred daily from the reactor to the regenerator through the connection 15 and transfer line 17. In the operation with the described apparatus pressure fluctuations in the transfer line were greatly reduced, the line velocity was increased about 25% and the pressure drop through the transfer line was reduced about 15% with resultant advantage in air blower capacity and burning rate in the regenerator. At the end of an extended period of operation the unit was taken off stream and upon inspection of the T section it was found that erosion was greatly reduced from that attending the previous operations prior to the installation of the inclined baffle plates.

Obviously, many modifications and variations of the invention, as hereinbefore set forth, may be made without departing from the spirit and scope thereof, and therefore only such limitations should be imposed as are indicated in the appended claims.

I claim:

1. Apparatus for dispersing and conducting finely divided solids as a suspension in a gaseous medium comprising a vertical conduit having an outlet at the lower end, a second conduit disposed at the lower end of the vertical conduit to receive solids delivered therefrom, and a plurality of overlapping baffles in the second conduit extending transversely of the outlet of the vertical conduit inclined downwardly in the direction of flow through said conduit at successively decreased angles to the horizontal from the top downwardly the downstream edge of each baffle overlapping the upstream edge of the baffle below it.

2. Apparatus for catalytic cracking including a reaction chamber and a regenerating chamber comprising a standpipe adapted for withdrawing catalyst from the reaction chamber, a conduit disposed at the lower end of the standpipe to receive catalyst therefrom and extending to the regenerating chamber, and a plurality of overlapping baffles in said conduit extending transversely of the vertical conduit and inclined downwardly in the direction of flow through said conduit at successively decreased angles to the horizontal from the top downwardly the downstream edge of each baffle overlapping the upstream edge of the baffle below it.

References Cited in the file of this patent

UNITED STATES PATENTS

| | | |
|---|---|---|
| 1,475,502 | Manning | Nov. 27, 1923 |
| 2,326,438 | Clarke | Aug. 10, 1943 |
| 2,586,705 | Palmer | Feb. 19, 1952 |
| 2,695,265 | Degnen | Nov. 23, 1954 |

FOREIGN PATENTS

| | | |
|---|---|---|
| 141,903 | Great Britain | Apr. 29, 1920 |